United States Patent [19]
Hastings et al.

[11] Patent Number: 5,501,535
[45] Date of Patent: Mar. 26, 1996

[54] ELECTRONIC MARKING INSTRUMENT

[75] Inventors: Nicholas J. Hastings; Peter J. Taylor; Graham S. Gutsell, all of Cambridge, United Kingdom

[73] Assignee: The Technology Partnership Ltd., Hertfordshire, United Kingdom

[21] Appl. No.: 295,834

[22] PCT Filed: Mar. 3, 1993

[86] PCT No.: PCT/GB93/00440

§ 371 Date: Dec. 27, 1994

§ 102(e) Date: Dec. 27, 1994

[87] PCT Pub. No.: WO93/17872

PCT Pub. Date: Aug. 16, 1993

[30] Foreign Application Priority Data

Mar. 3, 1992 [GB] United Kingdom ............... 9204589
Mar. 3, 1992 [GB] United Kingdom ............... 9204592

[51] Int. Cl.$^6$ ........................................... B41J 3/39
[52] U.S. Cl. ............................... 400/88; 347/109
[58] Field of Search ............... 400/88; 347/109, 347/110; 346/140.1, 143; 364/464.02, 705.03

[56] References Cited

U.S. PATENT DOCUMENTS

| 4,168,533 | 9/1979 | Schwartz | 364/464.02 |
| 4,746,936 | 5/1988 | Takahashi | 347/109 |
| 4,748,460 | 5/1988 | Piatt et al. | 347/109 |
| 4,758,849 | 7/1988 | Piatt et al. | 347/9 |

OTHER PUBLICATIONS

IBM Technical Disclosure Bulletin, vol. 14, No. 12, May 1972.

Primary Examiner—Christopher A. Bennett
Attorney, Agent, or Firm—Watson, Cole, Grindle & Watson

[57] ABSTRACT

A hand-held marking device comprises an electrically actuated writing head for making marks on a writing surface and a sensor for detecting when the writing head is moving in any direction in a plane parallel to the surface. The device includes a mechanism for causing the head to be actuated when the sensor detects relative movement of the writing head and the surface. The writing head can be arranged to be able to make a plurality of different types or sizes of marks on a writing surface, in which case a mechanism is provided for selecting which of the different mark types or sizes is to be made.

11 Claims, 7 Drawing Sheets

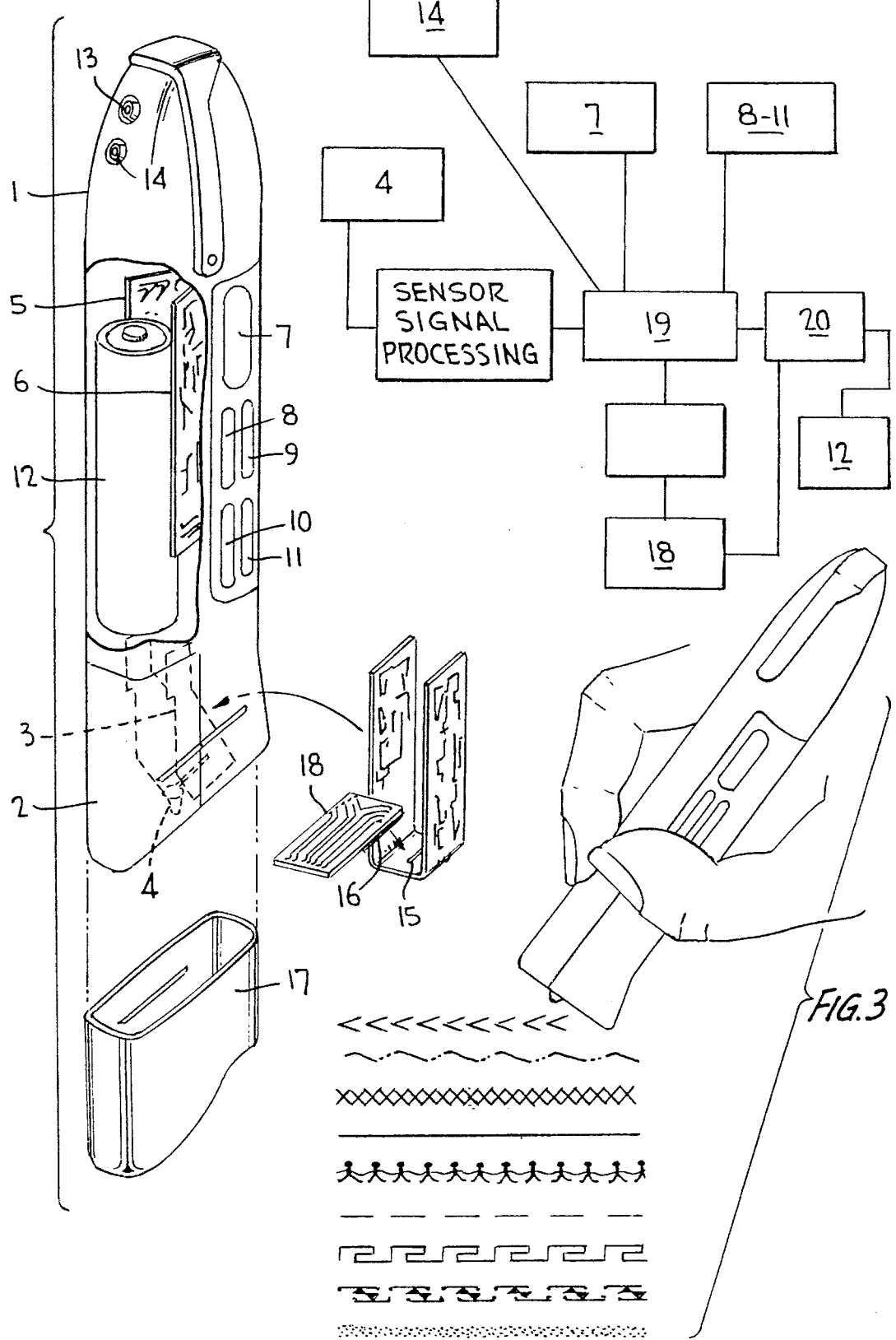

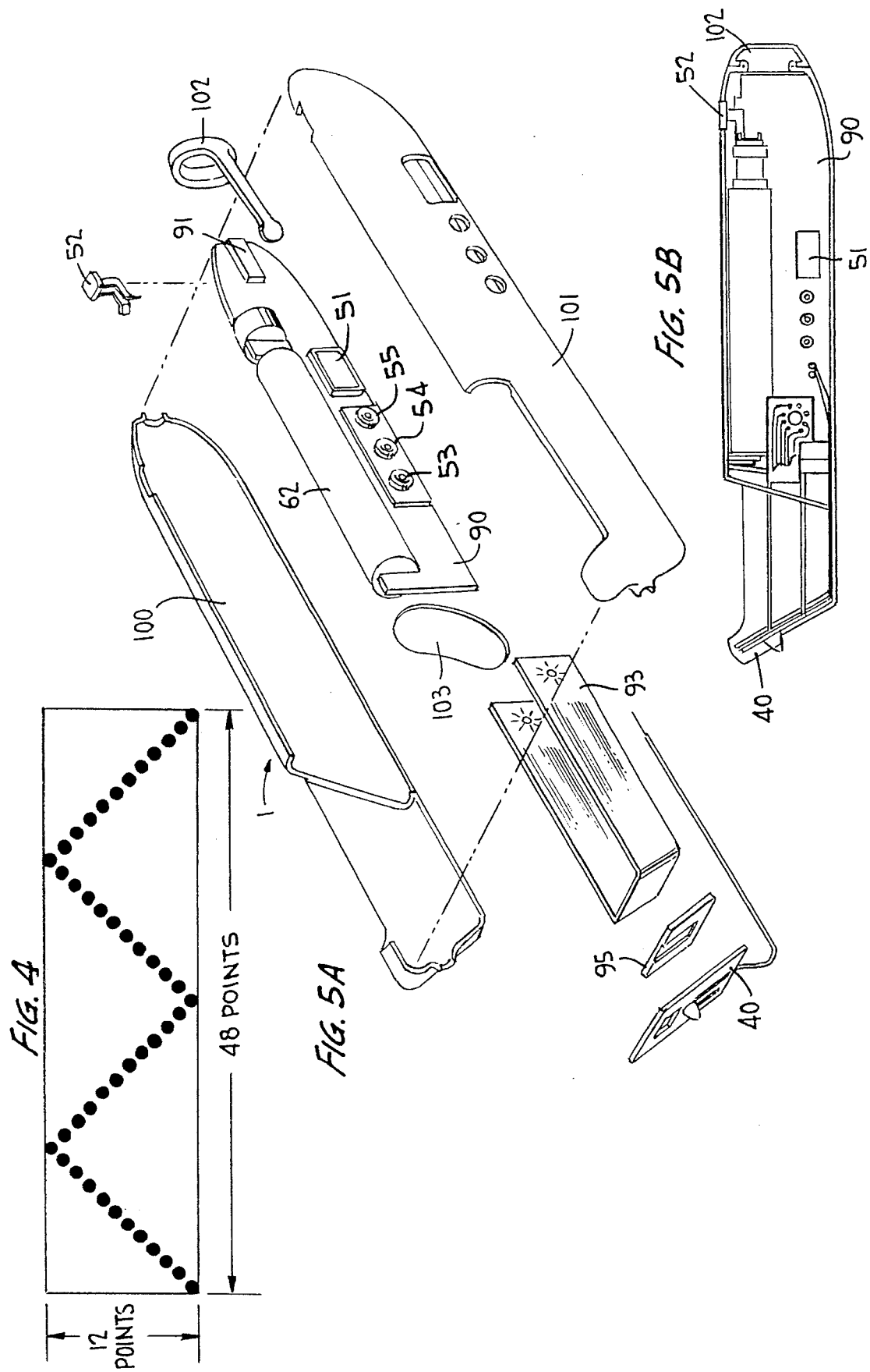

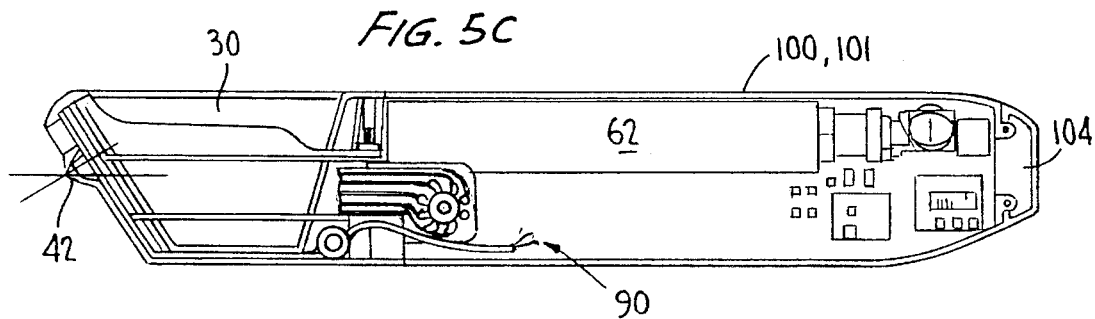
FIG. 5C
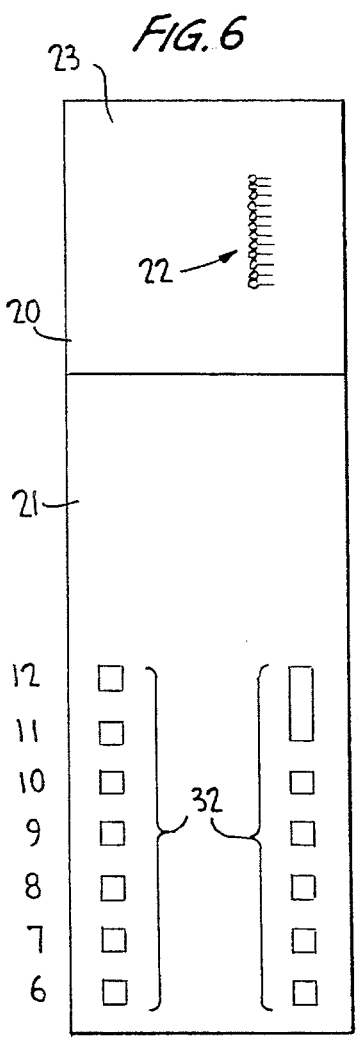
FIG. 6
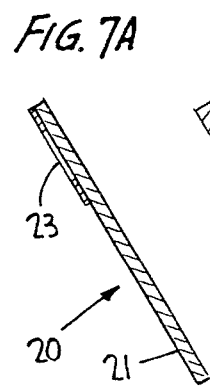
FIG. 7A
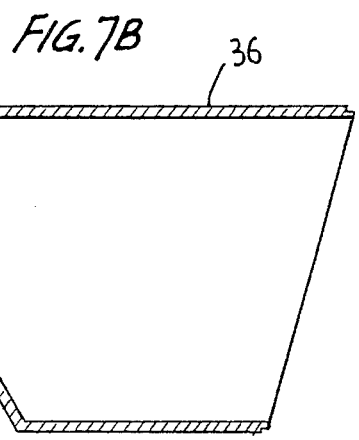
FIG. 7B
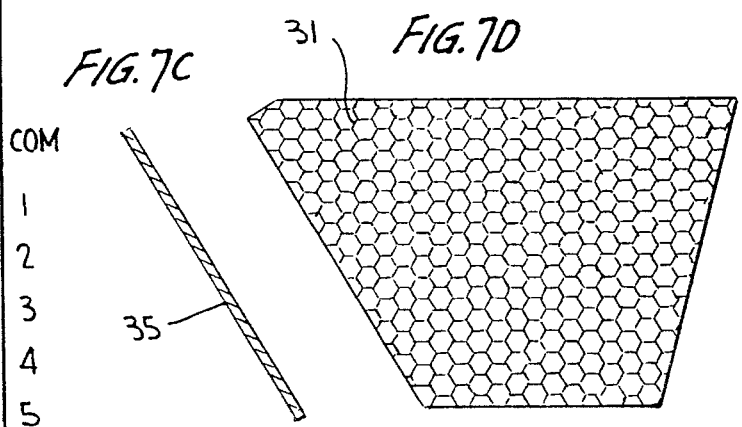
FIG. 7C
FIG. 7D

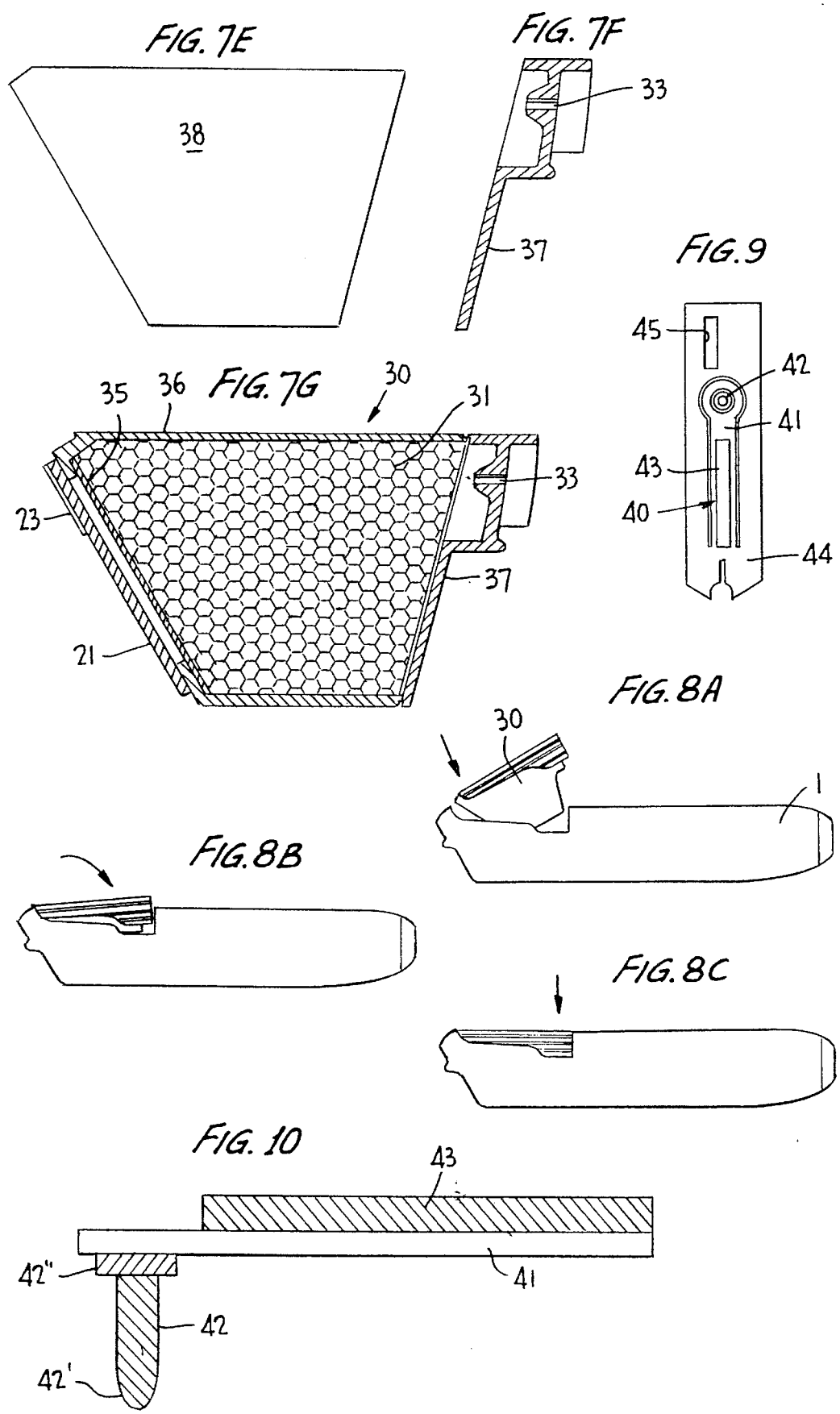

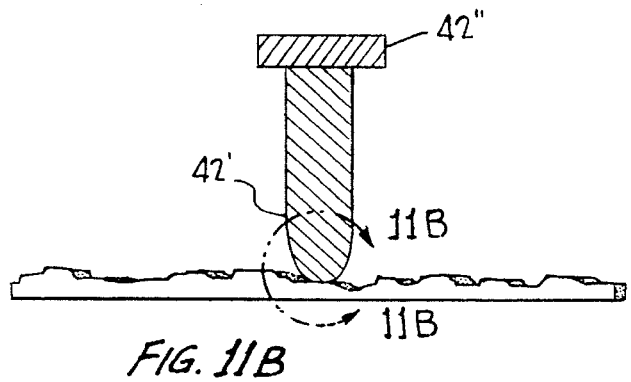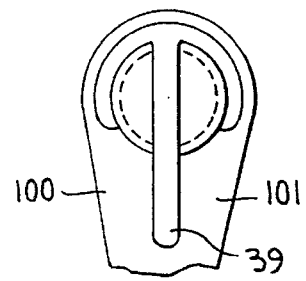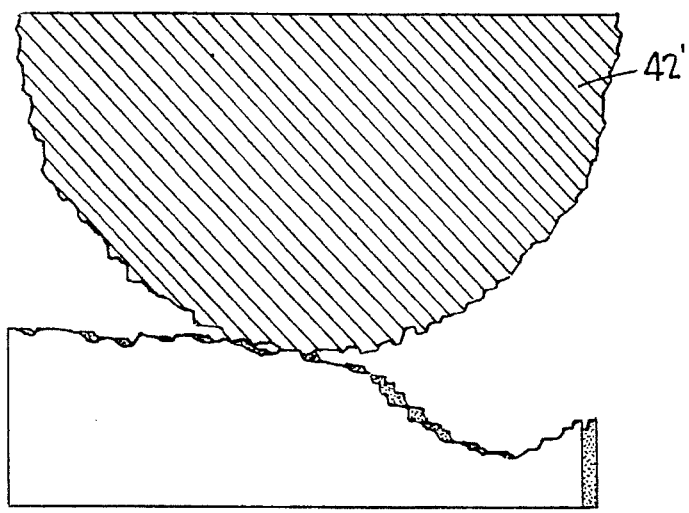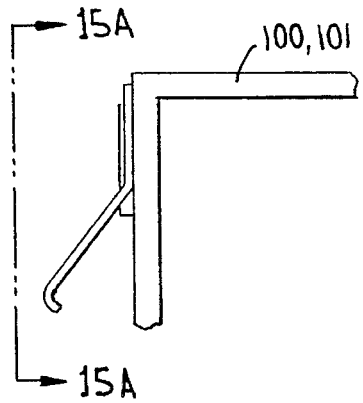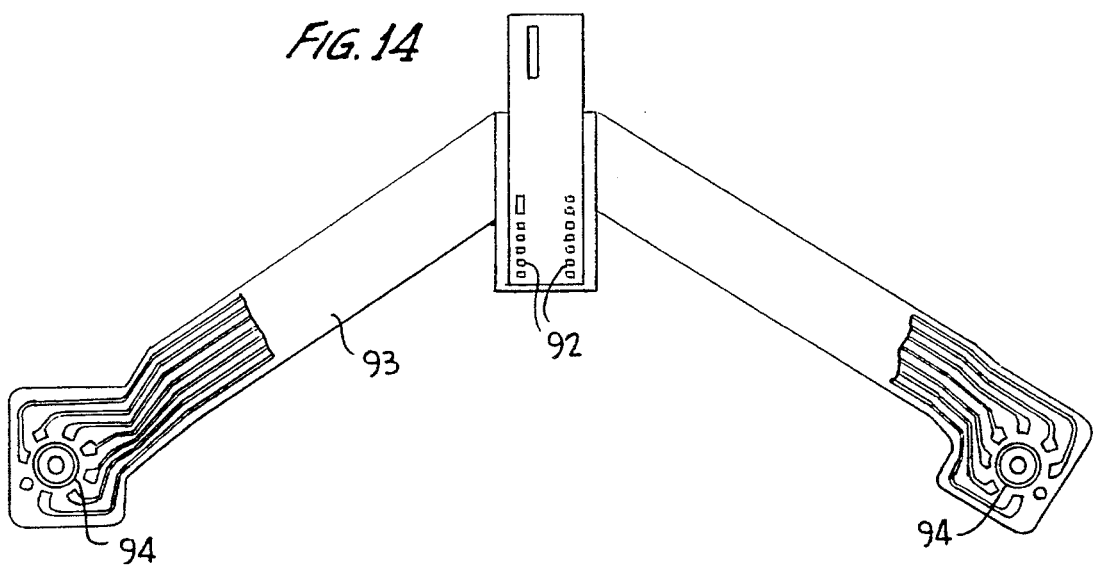

ELECTRONIC MARKING INSTRUMENT

BACKGROUND OF THE INVENTION

The present invention relates to a hand-held electronically-controlled drawing and writing instrument which provides electronic control of the width and pattern of the marks made by the device. More particularly it relates to such a device using ink jet technology to provide a writing instrument.

There exist various writing instruments including ball-point pens, fibre tip pens, pencils, fountain pens, etc., which allow lines to be drawn to form letters and images. If a different width of line is required, a different pen must be used. If the darkness of the line must be changed, a different pen or ink must be used. The user needs manual dexterity to create patterns, letters, or textures. In addition, conventional instruments rely on contact between the ink delivery device and the substrate for the transfer of ink to the substrate. Constraining the ink delivery device to touch the substrate compromises the number of features and level of performance that can be achieved.

U.S. Pat. No. 4,746,936 describes a pen using an ink jet nozzle to allow completely non-contact marking of surfaces, where the roughness or softness of the surface makes conventional contact marking difficult. The delivery of ink is controlled by a finger-operated switch mounted on the side of the pen. This tackles the problem of writing on difficult surfaces, but does not provide a means of producing high quality writing and drawings with the natural action of sliding a writing instrument over a surface.

The present invention has been devised to overcome the drawbacks of existing marking instruments and to provide features and benefits that have not been possible using conventional techniques.

SUMMARY OF THE INVENTION

According to the present invention there is provided a hand-held marking device comprising an electrically actuated writing head for making marks on a writing surface;

a sensor for detecting when the writing head is moving in any direction in a plane parallel to the surface; and means for causing the head to be actuated when the sensor detects relative movement of the writing head and the surface.

Preferably, the writing head is arranged to be able to make a plurality of different types or sizes of marks on a writing surface; and the device further includes means for selecting which of the different mark types or sizes is to be made.

Preferably, the marks are made by a multi-nozzle ink jet writing head which can be arranged to produce different patterns of marks, density of marks, marks of different width, etc., but in a device incorporating a single nozzle in particular, the size of droplet produced may be adjusted by the selecting means, for example to vary the width of a line being drawn.

The device will preferably include a battery (which may be re-chargeable) to supply electrical power to an electronic circuit to monitor the switches and the sensor and to generate the appropriate signals to control the writing head and to an electronic power supply circuit to drive the head and electronics with the necessary electrical supplies.

A supply of marking fluid may be provided in a replaceable cartridge.

A preferred embodiment of the invention includes a multi-nozzle ink-jet cartridge, as the marking mechanism, which is controlled by a microprocessor, ASIC, discrete electronic components or a combination of these, to write lines of variable width, density, and pattern, as selected by the user. The preferred sensor, the subject of a copending patent application, is a piezo-electric vibration sensor, which detects the vibration of a stylus as it travels across the writing surface.

The user is thus allowed to vary the width of the written line, by selecting different numbers of nozzles; to draw and shade with a range of electrically generated, selectable patterns; and to vary the density of the marks by selecting different ink delivery rates.

The device may incorporate a pressure sensing means for determining the pressure being applied to the writing instrument by the user, signals from the pressure sensing means being used, for example, to select which of a plurality of different line widths the device produces. The pressure sensing means is preferably integral with the movement sensor to reduce the number of parts.

BRIEF DESCRIPTION OF THE DRAWINGS

One example of a device according to the present invention will now be described with reference to the accompanying drawings, in which:

FIG. 1 is a diagrammatic perspective view of one embodiment of the invention;

FIG. 2 is a block diagram of the control electronics for this embodiment;

FIG. 3 is a chart showing different patterns which may be produced by the device;

FIG. 4 is a bit-map of a typical pattern which can be marked by the device;

Figure 12A:
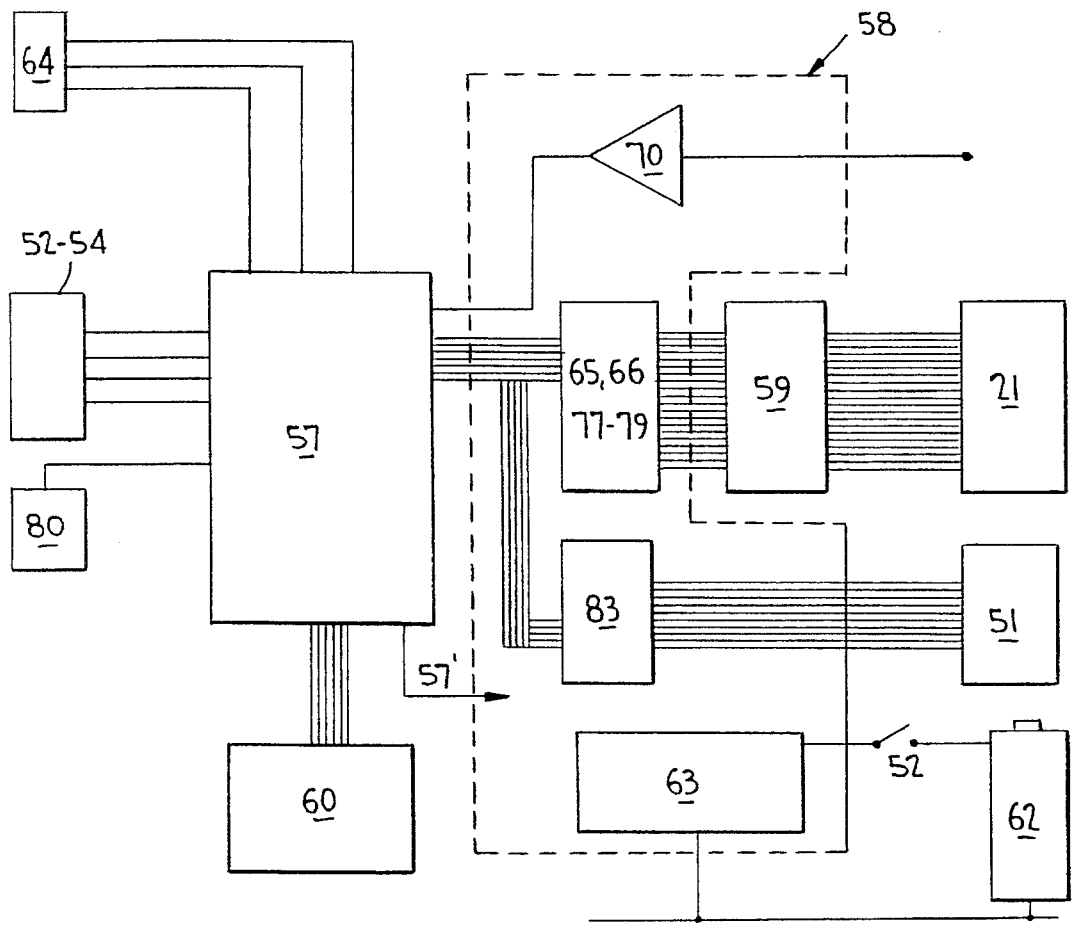
Figure 13:
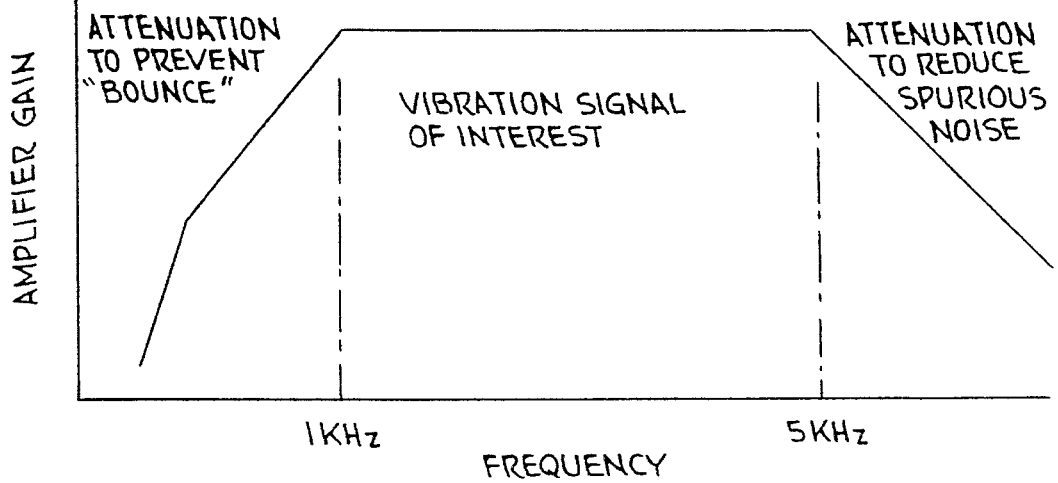
Figure 12B:
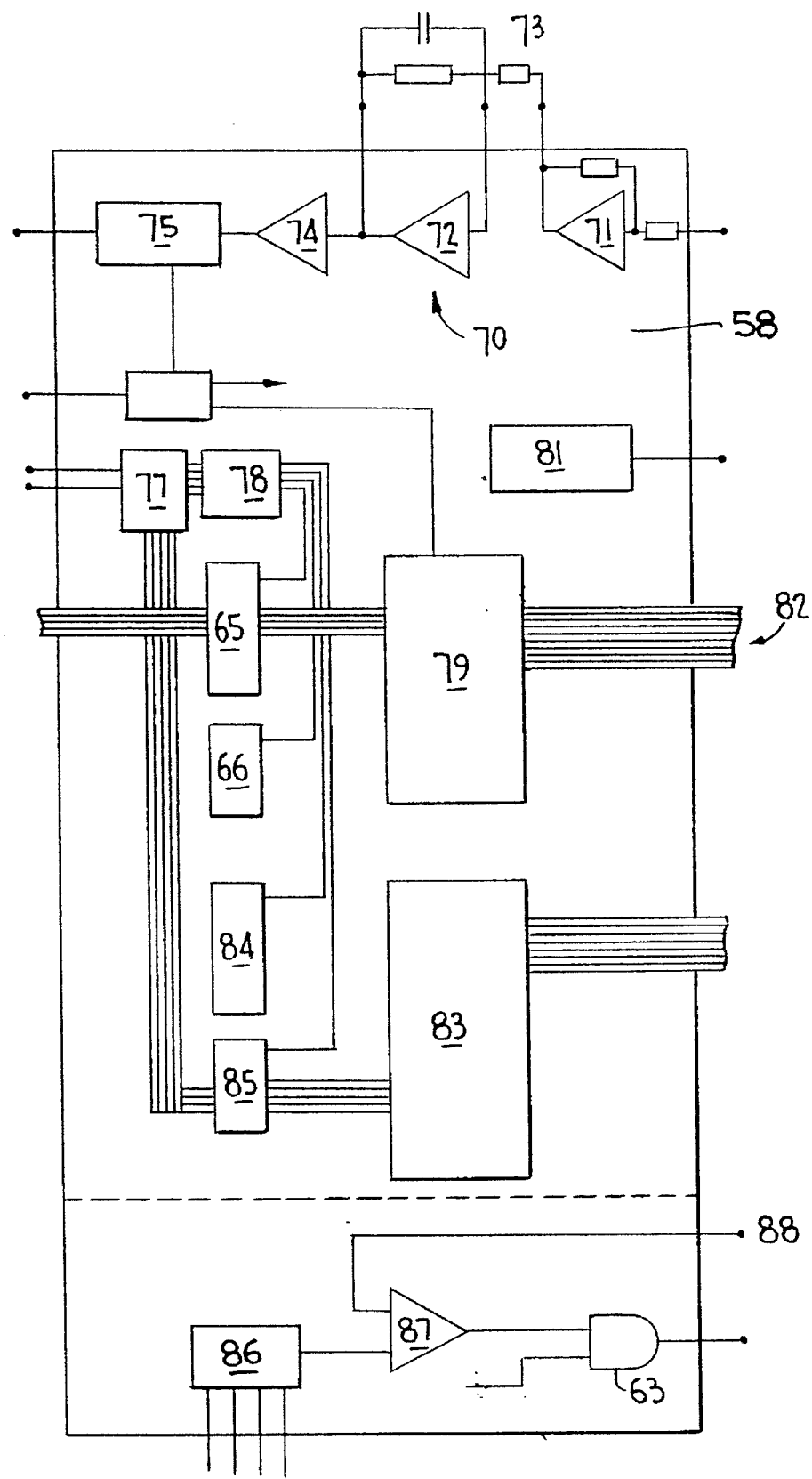

The remaining figures relate to a second, modified embodiment;

FIG. 5A is an exploded diagrammatic view of the modified embodiment;

FIG. 5B is a diagrammatic side view of the assembled instrument;

FIG. 5C is a sectional view of the assembled instrument;

FIG. 6 is a plan view of the nozzle plate and substrate of the second embodiment;

FIGS. 7A to 7G are views fo various components of the ink cartridge components, FIG. 7G showing the assembled cartridge in section;

FIGS. 8A to 8C show stages of insertion of the cartridge into the writing instrument;

FIG. 9 is a plan view of the sensor assembly;

FIG. 10 is a diagrammatic partial side view of the sensor assembly;

FIGS. 11A & 11B are diagrammatic side views of part of the sensor shown engaged with a sheet of paper, FIG. 11B being on a much enlarged scale;

FIGS. 12A & 12B are block circuit diagrams of the electronic components;

FIG. 13 is a waveform diagram showing filtering of the sensor signal;

FIG. 14 is a plan view of a flexible connector board used to connect the nozzle substrate to the electronic components in the pen; and FIGS. 15A & 15B are views showing further detail of the mounting of the ink cartridge in the pen.

DESCRIPTION OF THE INVENTION

The first device consists of a casing 1 in which are disposed a removable ink jet cartridge 2, a cartridge retainer 3, a vibration sensor 4, two electronic circuit boards 5,6, a liquid crystal display 7, switches 8–11, a battery 12, a socket 13 for connection to external power supplies and a socket 14 for computers or data terminals, and interconnections and contacts 15,16 for connecting the control electronics to the ink jet cartridge. The casing holds and supports the working components, and has a cap 17 to cover the sensor and ink jet actuator or cartridge tip 18 when not in use.

The ink jet actuator may be of the type shown in U.S. Pat. No. 4,500,895. Its operation and use are described in the Hewlett Packard (HP) Designer's Guide 5954-8535 (11/86), the HP Journal May 1985, and HP data sheets. To achieve a size compatible with a hand held device it is desirable to use the actuator with a foam based ink reservoir, such as the type shown in U.S. Pat. No. 4,771,295. The result is a small plastic cartridge 2 onto which is mounted the actuator 18 and in which a quantity of ink is stored in a foam reservoir.

To operate the marking instrument, the cartridge 2 is inserted into the cartridge retainer section 3 of the casing 1. Features on the cartridge and the casing ensure that the contacts 16 on the actuator are positioned correctly with respect to the contacts 15 within the casing. The casing contacts are preferably formed as areas on a flexible printed circuit mounted compliantly in the cartridge retainer. A clip may be used to secure the cartridge into the retainer in good contact with the casing contacts.

The ink jet actuator 18 consists of a glass substrate on which is formed an array of thin film resistive heater elements, positioned beneath a matching array of orifices and ink chambers formed in an electroformed plate secured to the face of the ink jet actuator substrate. The ink chambers communicate via a manifold in the plate and a hole in the substrate to the ink reservoir behind the substrate.

Thin film conductors on the actuator substrate form the actuator contacts and connect to the heater elements. When an electrical pulse signal is applied to the contacts of a heater element, the heater generates a vapour bubble in the ink, which expels a drop of ink from the corresponding orifice.

Formed into the cartridge retainer 3 is a vibration sensor 4. This consists of a metal cantilever beam (see our copending application No. 9204592.1) with a stylus mounted on the free end. A piezo-electric ceramic transducer is glued to the beam. When the pen is moved over a surface, the beam vibrates, and the transducer generates an electrical signal from these vibrations. This signal can be used to signal to the control electronics that the ink jet head should be operated.

FIG. 2 is a block diagram of the control electronics. To achieve a compact size, these are preferably constructed using two small printed circuit boards 5,6. Also, an application specific integrated circuit is used to implement many of the required functional blocks in as small a volume as possible.

The switches 8–11 and display 7 allow the user to select the desired operating parameters. The display can show a number of Icons or messages to indicate which mode of operation has been chosen. A numerical indicator, such as a seven segment character, shows which of a number of possibilities has been selected.

The user can switch between three parameter setting modes: line, pattern, and density. When line mode is selected, the user can specify the number of nozzles that should be actuated. In the embodiment described this could range from one to twelve nozzles. When the ink jet head is scanned over the writing substrate, the selected number of nozzles would be actuated repeatedly as long as a sensor signal is produced, generating line marks of widths from about 0.25 mm to 3 mm.

A microprocessor 19 actuates the appropriate nozzles by sending control pulses to the ink jet head. The ink jet head requires pulses at an accurate voltage higher than that which the microprocessor uses. The head pulses must also have a precise pulse length, and if multiple nozzles are to be actuated, they should be actuated at slightly different times to avoid undesirable interactions. The basic microprocessor logic signals are converted by the driver circuit to the form required by the ink jet head.

A sensor circuit filters unwanted noise and signals from the vibration sensor output. It uses a comparator to produce, when there is sufficient vibration, a logic signal indicating to the microprocessor 19 that the instrument is moving over the writing surface, and that the ink jet head should be actuated.

When pattern mode is selected, the user can use push button switches to select a particular numbered pattern from a range of available patterns, see for example FIG. 3. A pattern is produced by selectively actuating nozzles in a time sequence defined by the particular pattern. The sequence may be generated in a variety of ways. It may be generated by an equation or algorithm, e.g. to produce a regular checkerboard pattern or a pseudo-random pattern. It may also be generated by reference to a lookup table or bit-map representation of the required pattern.

The length of the pattern sequence is a matter of choice relating to technical implications, such as the amount of memory needed to store the sequence, and to artistic considerations.

In the embodiment described the length of the pattern sequence for bit-mapped patterns is chosen to be 48 picture elements, ie dots. The height of the pattern is defined by the number of nozzles to be 12. FIG. 4 shows a typical pattern bit-map.

The electronic circuit needs memory for software and patterns. In the embodiment described, for compactness and economy the microprocessor 19 which is used contains on-chip ROM and RAM, allowing a total of about 40 bit-mapped patterns to be stored.

Normally the microprocessor 19 will sequence through a bit mapped pattern repeatedly to produce a continuous patterned line as long as the user is moving the instrument. It is possible to provide the facility to switch the device into a single-shot mode in which only one sequence of the pattern is actuated.

The frequency at which the microprocessor 19 actuates the ink jet nozzles is derived fundamentally from the system's clock frequency. Ink jet heads of the type described can be actuated at frequencies from zero to about 2 kHz. When drawing lines, the higher the nozzle actuation rate, the more ink will be deposited per unit length of line, and the darker or denser the line. Similarly, in pattern mode, the higher the actuation rate, the smaller will be the distance into which a pattern sequence is compressed, increasing its density. In density setting mode, the user can select a number which relates to the rate at which the ink jet head is actuated.

The user may also want to use the controls to adjust the operating rate manually to suit different writing speeds.

Related to this, the vibration sensor produces signals which vary with writing speed. It is possible to add to the sensor circuit, for example to measure the mean vibration frequency, to produce a writing speed signal which the microprocessor 19 can use to adjust the actuation rate from its nominal value automatically.

The microprocessor 19 can communicate over a serial interconnection, via the socket 14 provided, to a computer, or some other electronic device. In one use of this link a joystick speed control is provided. In another use a writing speed signal is sent to the microprocessor 19 from a graphics tablet beneath the writing medium on which the instrument is writing. In another use patterns are downloaded to the microprocessor 19 and memory from a computer or other terminal device on which they are created.

A rechargeable battery 12 is used to provide the electrical power for the instrument. A battery charger or external power supply could be connected via the socket 13. Non-rechargeable batteries could be used, but the facility to replace them would need to be provided.

A DC-to-DC converter (PSU) 20 is provided to generate the voltage required by the ink jet head, as this is inconvenient to supply from a small battery. The power supply circuit monitors the output of the converter and controls it to the required level to a high accuracy.

The invention has been described in relation to specific embodiments, applications and technologies. Many variations within the scope of the invention are possible. For example the fluid may not be ink for visual observation; it may be adhesive, or a cosmetic, or a conducting fluid for forming printed circuit tracks. The sensor may be any omni-directional alternative, such as the graphics tablet described. The marking mechanism need not be a drop-on-demand ink jet head, but may, for example, be a printing mechanism for printing on thermally sensitive paper.

Reference will now be made to FIGS. 5 to 13 in connection with the modified embodiment. Many components are generally similar, but the second embodiment is the preferred embodiment and is shown and described in greater detail.

The writing instrument of the second example is broadly similar to the first and is based on a multi-nozzle ink jet head. Its main features are that it is/has:

Compact, ergonomic, and self-contained, hand-held

Battery powered

Renewable ink supply and ink jet head

Sensor controlled to give naturalwriting action

Capable of writing a variety of lines and patterns

Capable of being attached to various other electronic devices

User selection and/or programing of patterns

Suitable for low cost, high volume manufacture

The main elements of the pen are:

Casework

Ink Cartridge (including head and ink)

Writing sensor

Electronic sub-system

The functional requirements of the pen define what the pen should do. The specifications of the pen define what characteristics the pen should have to meet the requirements. For each part of the pen, there are particular requirements and specifications which are important. The following sections document the requirements and specifications for the main elements of the pen.

CASEWORK (FIGS. 5A to 5C)

The casing 1 of the pen is shown best in FIGS. 5A–5C. The casing is in two main parts 100,101 which together enclose and support the other components of the writing instrument (or pen). A pocket clip 102 is provided and, apart from access for replacing an ink cartridge, the interior is not accessible to the user in normal use. The pen has a wedge-shaped cross-section, for comfort and to accommodate the rechargeable battery (to be described later). A bulkhead 103 separates the electronic components from the ink cartridge space and a rear closure 104 mounts the clip 102 and helps to keep the two halves together.

INK-JET HEAD (FIG. 6)

The head 20 is capable of producing variable patterns, lines, and broken lines, fast enough for high speed writing and has power requirements suitable for hand-held, battery operation, whilst providing for high quality writing on various household and office papers. The head is small in size to give pen-like appearance and a good view of writing and is a conventional bubble-jet printhead.

The head comprises a glass substrate 21 with 12 nozzles 22 on a nozzle plate 23 at a pitch to provide 38 dots per cm (96 dots per inch) at a line width of 0.2 to 3.2 mm and at a maximum drop rate of 1250 dots per second.

INK CARTRIDGE (FIGS. 7A–7G)

The ink cartridge 30 has to work in all orientations, must not leak during use, transport, or storage and must hold enough ink to justify its cost and for customer convenience. The cartridge must be easily removable for replacement or colour change and provide electrical connections to the pen body.

Ink is delivered at >2 ccs at 50 mg/100 m to lay down a 0.2 mm wide line. Capillary foam material 31 is used as a containment medium of the reservoir 34. Most ink jet printer heads are designed to print onto a near vertical paper surface, but that of the present invention should work when pointing up, down or in between. This forces a tighter requirement on the reservoir 30 than is normal, as it must be able to print successfully when the reservoir is up to 3 cm below or above the ink jet orifices. Thus the design compensates for gravity heads of ±30 mm of ink.

A properly vented reservoir is necessary and a back pressure of a few centimetres of ink will also be required to stop ink leaking out of the cartridge (drooling) under normal conditions, whether the cartridge is vented or of sealed construction.

The cartridge has to be readily replaceable and should provide for a removable snap-fit into the pen body and not allow incorrect insertion, at the same time being robust so that it does not easily break or crack.

The substrate 21 requires 13 pad-contact connections 32 to be made under light spring pressure. The design of the sprung connector to achieve this is described elsewhere.

Priming and purging are important considerations during manufacture. Priming is the operation of establishing a continuous ink path from reservoir to ink jet nozzles. It can be achieved by applying air pressure to the vent 33 structure, or by sucking on the ink jet nozzle plate. Of the two methods, applying pressure to the vent 33 is preferred, as this eliminates the possibility of degassing the dissolved air in the ink, and avoids mechanical contact with the delicate nozzle plate 21 of the ink jet head. Purging is the process of unclogging the nozzles 22, or of eliminating air bubbles from the ink jet chambers. Similarly, this is best achieved by applying air pressure to the vent hole 33. A small bore tube (not shown) that fits and seals in the vent hole is used for purging and priming operations. Simply blowing lightly into the tube is sufficient for operations. It is useful to invert the cartridge for these operations, as the nozzle plate can then be observed whilst blowing. Purging and priming are complete when no further air bubbles come out of the ink jet nozzles. The drop of foamed ink formed on the nozzle plate formed by these operations can be wiped away with a tissue immediately, or can be left on the nozzle plate to reabsorb into the cartridge over a few seconds before wiping the nozzle plate clean. The ink reabsorbed in this fashion will not contain any air. As an alternative a small elastomeric bellows device may be provided as an accessory that allows easier priming and purging. In use, purging has been found not to be necessary in the great majority of cartridges during their initial usage, before refilling is necessary.

The ink inside the cartridge 30 must be kept at sub-atmospheric pressure to eliminate leakage (drooling) from the ink jet nozzles or from the vent hole in the cartridge. The desired negative pressure operating range has been established as 60–120 mm of ink. This gives a 100% margin of safety against leakage when shaken or dropped, keeps back pressure below the back pressure level at which writing quality deteriorates, and gives a wide enough operating range to allow for substantial variation of the ink storage material, (i.e. pore size variation).

In order to provide low flow resistance, low density, maximum void volume, minimal debris in a material inert to inks, a reticulated foam reservoir 34 is provided. Such a structure can support a back pressure of 60–120 mm of ink and is flexible in shape, low in cost as well as being easily fabricated, easily assembled into the cartridge 30, and capable of being rapidly filled with ink.

Examples of such materials are polyester P.U., polyether P.U., and melamine formaldehyde. Maximum useable ink storage is in open celled foams linked with:

low foam density degree of reticulation in foam narrow distribution of cell size cleanliness of foam.

In P.U. foams, reticulation is the process by which the thin cell walls of a foam are burned away, dissolved or shattered to leave a more open pore structure with lower resistance to fluid flow.

Polyester and polyether polyurethane foams are made by free expansion chemical blowing or closed cavity chemical blowing.

The capillarity equation below can be used to estimate the ideal cell size for P.U. foams. For a tube of radius r, the negative pressure (h, measured in centimetres of working fluid) generated by the capillary equation:

$$h = \frac{\gamma_L \cos\theta}{\rho g r}$$

where h=negative pressure in centimetres of ink (h=P×$\rho_L$×g)

$\gamma_L$=surface energy of liquid (i.e. ink) in contact with air

θ=wetting angle of the liquid against the material of the tube wall (~20° for polyurethanes against ink)

ρ=density of liquid (~1000 kg/m³ or 1 gm/cc)

g=gravitational constant (9.81 ms$^{-2}$ or 981 cm.sec$^{-2}$)

r=internal radius of the capillary tube.

Keeping consistent units and inserting some typical values:

$\gamma_L$=35–40 dyne cm for water-based ink

ρ~1.00 g/cc for water-based ink

θ=20°

Cos θ=0.94 rearranging for h=9 cm. (midpoint of desired range 6–12 cm)

r=75–85 μm ideal pore diameter=150–170 μm

To reduce the cell size from 250–300 μm down to 150–170 μm, the P.U. foam is compressed in at least one direction by 40–43%. Polyether P.U. foam should then achieve the correct back pressure of 9 cm of ink. A dynamic back pressure is added to the value calculated for capillary effects alone. For a maximum flow rate of 3 mm³.s$^{-1}$ (0.18 cm³c/minute), ie 12 nozzles operating at 1250 Hz, it is calculated that the dynamic pressure drop caused by flow of ink through the foam is less than 10 mm of ink.

In order to supply approximately 2 cm³ of writable ink in each cartridge, given that the reservoir material is a capillary foam 31, it is possible to estimate the volume of reservoir material required from considering the following important variables:

1. Void volume of foam when compressed to give correct back pressure.
2. Extraction of ink contained in reservoir before back pressure becomes too high.
3. Fraction of foam void volume that can be filled without negating back pressure (by overfilling).
4. Fraction of internal volume of cartridge not occupied by vent structure.

The overall volumetric efficiency can be written as:

$$\eta\text{Total} = \eta_{(1)} \times \eta_{(2)} \times \eta_{(3)} \times \eta_{(4)}$$

Where subscript numbers refer to the numbered points above: From our calculations and experiments, we determined:

$\eta_1$=80%

$\eta_2$=75%

$\eta_3$=85%

$\eta_4$=95%

Therefore, $\eta_{Total}$=0.8×0.75×0.85×0.95

| Volumetric Extraction Efficiency | = | 0.485 |
|---|---|---|
| | = | 48.5% |

Therefore, if we require 2 cm³ of writable ink, we require the internal volume of the cartridge to be:

| Cartridge Internal Volume | = | 2cc/0.485 |
|---|---|---|
| | = | 4.12cc's at least. |

To allow a margin of error on the calculation above, we set the internal volume of the cartridge to be 4.5 cc's at maximum.

Cartridge Filter

Between the foam reservoir 34 and the nozzle substrate 21, a screen filter 35 is necessary to protect the ink jet chambers from debris and air bubbles. Debris will clog the jets or cause deflection of the ink jet, and air bubbles above a very small size will stop the ink jet from ejecting ink by increasing the compliance of the ink jet chamber. For a particular filter mesh hole size and material, there exists a bubblepoint pressure, below which no air bubble larger than the hole size can pass through the filter. It is important to ensure that this bubblepoint pressure is above the operating range of back pressures, but not so high that air bubbles cannot be flushed through the filter and out of the cartridge during priming and purging operations. Experiments and calculations showed that a hole size of up to 20 micron diameter were allowable, but that we could use a 5 micron filter size without compromise of priming or purging.

The physical size of the filter 35 is also important, as larger filter areas offer less resistance to flow, and tolerate more air bubbles on their surface before ink supply to the ink jet head is cut off.

The open area of filter 35 is maximised to avoid large dynamic back pressures during operation of ink jets. The filter may also be used to cause local high compression of the foam reservoir which can aid in ink extraction efficiency. A sintered stainless steel fibre filter material from Bekaert Fibre Technologies (ST20BL3), is the optimum material for the filter 35.

We calculated the dynamic pressure drop due to flow at maximum rate (12 nozzles firing at 1250 Hz) for this filter, which is below 10 mm of ink for a 7 mm$^2$ filter area. This is the area that can be regarded as a minimum value. Later experiments showed that we could successfully use the 5 micron (ST6BL3) and 10 micron (ST10BL3) Bekaert materials as ink cartridge filters. The bubblepoint pressure of these filters are 70 and 37 mbar respectively. Initially, these filter materials were glued into metal holders using rapid setting epoxyadhesive (Devcon 5-minute epoxy). Small squares of the Bekaert material were easily glued using Devcon onto the back of the glass substrate.

The first cartridges used flat 5 mm×5 mm squares of Bekaert ST20BL3 glued with Devcon to cover the ink entry hole of the ink jet substrate 21. Using a 1 mm border fillet of Devcon reduced the effective filter area to 9 mm$^2$. This worked adequately, but showed noticeable dynamic pressure drop in experiments. Later cartridges employed a ST10BL3 filter of 5×22 mm area, with a raised 2 mm high centre section of 2×20 mm created by a press tool. This enlarged the effective filter area to 40 mm$^2$ which gave better ink extraction efficiency by allowing more contact area with the foam reservoir, and also offered lower dynamic flow resistance.

An alternative method of attachment was that the filter 35 was heat staked at 250° C. to the perforated base of the cartridge outer shell 36. This change was made to allow easy installation of filter and foam in production and eliminated the need for adhesive bonding. The metal fibres of the filter allow good heat conduction and molten plastic flow of the case material into the filter, ensuring an airtight joint between filter and outer casing 36.

The vent 35 (hole in outer casing of reservoir) is needed to allow stepwise replacement of jetted ink with air to eliminate the build-up of negative pressure as ink is removed from the foam material, as well as to allow an entry site for ink filling of the foam reservoir and to prevent the leakage of ink when the cartridge is dropped or shaken. It also allows external pressure to be applied to the reservoir for priming or purging operations, as mentioned above, to ensure that the vent hole does not get filled with free ink.

The shape of foam cut is such that, when inserted in the cartridge case, the foam is compressed by 5 mm in thickness near the HP substrate, but not compressed in thickness at all near the vent.

The design of the cartridge is shown in the following exploded FIGS. 7A–7F and FIG. 7G.

The case is in two parts: cartridge shell 36 and cartridge cap 37. The filter is fitted into the case by heat staking rather than bonding it to the substrate with adhesive. The foam 31 is inserted by means of a special sleeve 38. This is a production solution to the problem of high friction between the foam 31 and the cartridge case 36.

The cartridge shell 36 is the primary casework component. It contains the filter 35, foam 31 and a foam sleeve 38, and the substrate 21 is bonded to its front face. A slot in its front face provides a path for ink, from the foam 31, through the filter 35 and to the substrate 21. The material for the shell 36 is either ABS or SAN, both of which are low cost, tough and abrasion resistant polymers commonly used for casework components on electronic components and domestic goods. The shell is designed to be produced on simple two-piece mould tooling.

The cap 37 forms a closure to the shell to which it is fixed by ultrasonic welding. It also contains the air vent 33 to the cartridge, which in addition to its function as a pressure equilibrium vent, is used for ink filling. Like the shell, it is manufactured in ABS or SAN and is also designed to be produced with simple two-piece tooling.

The foam sleeve 38 is an assembly aid. The coefficient of friction of the foam 31 (with plastic surfaces) is high making it very difficult to slide the foam into the shell. The foam is picked up in the foam sleeve which then slides easily into the cartridge shell. It is stamped from 0.2 mm polyester sheet.

The geometrical location of the cartridge 30 in the pen's casework is of critical importance, not only to achieve the correct appearance when installed, but also to ensure the electrical connections to the substrate. The latter requires the substrate to be parallel to the embossed area of the flexible circuit, the embossed contacts to be aligned with the substrate contacts and a spring pressure of greater than 300 g to be constantly applied to maintain the contact force on each embossed contact. The force of 300 g across the embossed area causes a deflection of about 0.4 mm. In the pen, the movement of the cartridge beyond the 0.4 mm compression is prevented by a feature in the location pocket.

The retention spring 39 (see FIGS. 15A & 15B) located in the casework above the cartridge has three functions:

to provide a 'click' feature when the cartridge is fully inserted.

to exert the 300 g force to compress the contacts and maintain the cartridge shell against the travel stop.

to contribute to holding the casework halves together.

The cartridge insertion procedure needs to be a simple operation that even fairly young children can perform. It must not therefore depend on the user performing any special actions but all the criteria for alignment etc must be derived from the casework.

In addition, when the contact pads 32,92 meet each other it is undesirable for any sliding motion to be taking place which could have the effect of damaging them.

In order to meet these requirements the insertion consists of three very simple motions, as shown in FIGS. 7A to 7C.

During the initial phase, the nozzle plate end of the cartridge is inserted into the end of the casing; during the second phase of movement the region of the cartridge around the substrate is guided into and engages with a pocket inside the casework in a rotational manner, thus ensuring alignment. The final stage is to push the cartridge fully into place which compresses the retention spring 39 (see FIGS. 15A & 15B), thereby establishing the contact force. Removal of the cartridge is the reverse of insertion.

The substrate 21 is bonded to the shell by UV curing adhesive. Its positioning and alignment with respect to the shell prior to making the bond is critical to ensure reliable electrical connection when fitted into a pen. There is no provision on the shell to achieve the alignment since there is insufficient room to incorporate any features; the alignment therefore relies entirely on the tooling used to position it. The tooling must accurately locate the cartridge and the substrate before bringing them into contact and throughout the adhesive curing to ensure that no movement can take place.

During the manufacture of substrates it is common for small flares to be left at the corners of the glass rectangle. Consequently, during alignment, it should be located away from the corners.

In order to successfully fill the cartridges with ink it will be necessary in production to firstly evacuate them for two principle reasons:

to exclude the air and remove the possibility of air bubbles being left in the foam after filling.

the foam is hydrophobic, that is it resists contact with water based liquids. Filling under vacuum, forces the ink against the foam surfaces and overcomes its hydrophobicity.

When the ink is introduced it should pass through a hypodermic needle to a point just behind the filter so that the ink front passes through the foam from bottom to top. The needle is inserted through the air vent 33 in the cartridge cap 37.

SENSOR (FIGS. 9 to 11B)

It is worthwhile considering the theory before describing the sensor actually used in the embodiment.

The speed of sound in steel is roughly 6000 m/s. At the current maximum sensor operating frequency of 20 kHz, therefore the wavelength is 250 mm, much longer than the sensor (10 mm).

This means that in modelling the behaviour of the device, we can assume static behaviour. The calculated "tuning fork" resonance frequency of a steel beam is:

$$f = \frac{1}{2\pi} \cdot \frac{6EI}{\left(M_1 + \frac{M_2}{2}\right)^3}$$

where $M_1$ is the tip mass $M_2$ the beam mass and I the cross-sectional area moment. For the current sensor this resonance frequency is f=68 kHz.

The design must not change in such a way as to bring the resonance frequency within the sensor passband, otherwise the sensor will be very sensitive to stray vibration.

The position of the neutral surface in relation to the glue line in a piezo-steel beam is given by the equation:

$$y = \frac{E_s d_s^2 - E_p d_p^2}{2(E_p d_p + E_s d_s)}$$

where $d_s$ is the steel thickness and $d_p$ the piezo thickness.

For a fixed maximum writing force, F, the energy stored within the piezo is maximised if the neutral surface is at the glue boundary. This also reduces the stress on the glue (in this case only shear forces act on the glue line). In this case y=0 so $$d_p = d^s \cdot E_s/E_p$$

The Young's modulus of steel is 200 GPa and that of PZT5 70 GPa. Therefore $$d_p = 1.7 \times d_s$$

The piezo thickness should therefore be around 850 µm for a 500 µm thick steel beam.

The maximum stress within the beam as at the support point, since the bending moment G, is maximum there for a force F applied at the tip. The piezo should therefore cover the support end of the beam.

It is reasonable to expect that a beam which is very flexible will detect large signals, for two reasons. Firstly, a stiff beam will crush paper height variations more readily, and secondly, since the work done on the piezo is the writing force (which is externally fixed) multiplied by the beam deflection, the energy transfer will be greater for a beam which gives greater deflection. Therefore the beam should be as narrow as possible. Practically, a 1 mm thick beam is at the limit of ready manufacture.

The beam will fail for maximumwriting pressure if the shear force on the glue line exceeds the specified shear limit. The shear stress for a fixed load is constant down the length of the beam and is given by:

$$\text{Shear Stress} = \frac{3F}{4d_s w}$$

where $d_2$ is the steel thickness and w the beam width. Typical fail shear stress for most adhesives is around 50 MPa, hence for safe operation $$\frac{3F}{4d_s w} < 50 \times 10^6$$

The maximum force is F=3N, the width is w=1 mm and $d_s$=500 µm, so $$\frac{3F}{4d_s w} = 4.5 \times 10^{-6}$$

i.e. the applied shear stress is 1/10 the shear stress limit at maximum specified writing force.

The proposed beam structure is shown in FIG. 10.

The sensor tip has to be constructed of a hard material to prevent excessive wear/alumina or sintered steel are the most probable materials. Given the material the surface structure may be tuned to alter the sensor characteristics. There are two critical parameters:

The 'feel' of the pen is important for market acceptance. The sensor must not feel rough as it runs over the paper.

The tip should have a surface structure which maximises the output signal.

The surface of paper consists of a mat of bound fibres. The typical fibre width is around 10 µm and this defines the maximum feature size. However, it is the gaps between fibres which the tip detects: in this case the typical feature size is around 5 fibre diameters (50-µm).

A MathCad model suggests that with a smooth tip, the output frequency spectrum will be:

$$P(f) = Af^2 e^{-2f/l}$$

where l is the typical fibre to fibre distance.

Where the typical tip feature size is less than or much larger than the figure size, this spectrum is independent of tip surface.

Only using a tip with monodisperse roughness similar to the fibre size increases the high frequency content of the spectrum.

For a 30µ typical feature size the bulk of the spectral power is in the 1–3 Hz region. There is no useful spectral power above 5 kHz.

Experimental results cam be summarised as follows:

The signal frequency and power response is optimised for a 30μ typical surface feature size. In this case the original power is around 16 dBV higher than that produced by a smooth tip (an increase of 40 times).

A coarse (30μ) tip gives larger higher frequency components.

The rms signal power rises by a factor of 3.2 for an increase in speed by factor 3.7 i.e. the rms power is roughly proportional to writing speed.

The drag remains roughly constant regardless of writing speed. The work done against the drag is drag multiplied by velocity, so we would expect the sensor output power to rise linearly with velocity).

The signal power is non-linear with applied load. An increase in load of 1.3x resulted in 3.2x increase in rms sensor output power. This exponential rise may be due to the tip pressing further into the paper surface (according to the model the fibre density increases exponentially with depth into the paper). This suggest that a sharper tip, giving higher pressure for the some writing load, will give higher signal output power.

The tip should therefore be as sharp and rough as possible without excessive degradation in 'feel'. A reduction of dip radius to around 100 μm (similar to the ball in a Pentel) should be achievable, although such a tip would have to life tested for increased wear.

The "feel" of the sensor as it moves across the paper, whilst of no technical interest, could be of much commercial importance, since it adds towards the market acceptability of the pen. "Feel" may be split down into three subjective judgements made about the sensor:

Vibration—do the fingers detect vibration in the pen as it moves?

Scratching—is the sensor tearing the paper fibres?

Noise—does the sensor sound as though it is rough?

Scratching is the worst effect and it occurs when small radii of curvature are present on the sensor tip. In these areas the applied writing force is translated into a large pressure which punctures the paper surface and causes a harsh stick-slip motion, as might be expected when a needle is moved across paper. (The worst case is when the radius of curvature is less than or equal to the typical surface fibre—to fibre distance (c. 15 μm typically), so that the tip digs into the surface). Subjectively the effect is the combination of stick-slip motion detected by the fingers with the scratching noise. Thus, overall tip radii must be greater than 50 μm to avoid tearing.

The frequency limit due to reaction times in generalised nerve cells is around 1000 pulses per second; it is therefore not unreasonable to expect the vibration of frequency in excess of 1 kHz will not be detected as vibration by generalised nerve cells (of course the cells within the ear show substantially different frequency response, since they are specialised for this purpose). Tests on two 'typical' individuals show that subjective roughness is related to the typical feature size of the tip. Sizes less than 15 μm on this scale appear to give an acceptable 'silky' feel whereas particle sizes greater than this can give a stick-slip motion.

Grains less than 15 μm diameter should give acceptable 'feel' but there is clearly a compromise necessary and therefore the tip employed has grains of approximately 30 μm size and the tip has a diameter of around 500 μm (see FIGS. 11A & 11B).

The detailed construction of the sensor will now be discussed with regard to FIGS. 9 to 11B.

The sensor 40 provides for a natural control of ink delivery during writing, causing the ink to flow when the user wants to write. This thus gives an acceptable "feel" when writing. The sensor has to be sufficiently robust to resist damage, for example, when the instrument is dropped accidentally, and must be capable of operating over a wide range of papers, hand pressures, writing speeds, writing angles, etc. Further commercial requirements are: low cost, small size, immunity to electrical and mechanical interference, and low power consumption.

A writing speed of 30–150 mm.s$^{-1}$ is a typical range of speeds which needs to be accommodated together with a writing force of 30–300 g. The sensor should provide an perceived stiffness comparable with a ballpoint pen.

The essential function of the sensor is to provide a signal to the pen's control electronics to switch on the ink jet mechanism when 'writing' is taking place. 'Writing' consists of certain specific conditions and so the ink jet must be switched on only when they are met as follows:

the pen is in contact with the paper and moving across it in any direction;

the pen comes into contact with the paper without moving across it (as in a full stop).

If the pen is in contact with the paper but not moving the ink jet must be switched off, otherwise the result would be a continual ink supply to a single point.

A vibration sensor was identified as the best method of achieving these requirements in a unit with relatively simple signal processing.

If a stylus is drawn across paper (which on a microscopic scale is a rough surface) vibration is produced in three mutually perpendicular directions, two of which are parallel to the paper and at 90° to each other, the third is the vertical component, perpendicular to the paper. The sensor of this invention responds to the vibration component in the vertical direction which has two specific advantages:

it responds equally to vibrations produced by travel in any direction across the paper;

it allows a very compact sensor design.

The sensor 40 was designed to occupy the otherwise unused space below the substrate 21 and between the contact areas.

The sensor mechanism consists of a metal beam 41 (supported at one end, with a stylus or tip 42 at the other end) with a piezoelectric strip 43 bonded to it. The beam and piezoelectric strip bend in response to the vibration signals from the paper.

The size and shape of the elements of the sensor are governed by the following:

the space in the available volume, described above;

the need to provide sufficient signal strength for the electronic control system to process it without unreasonable need for very high sensitivity;

to be sufficiently stiff to give the pen the correct 'feel'. This should not feel in any way soft and so require an awkward writing action. The following graph shows the measured load/deflection characteristic of the beam/piezo.

to be sufficiently robust to withstand heavy writing pressure or inadvertent impact (within reasonable limits).

As a force is applied at the stylus 42, a bending moment is produced in the beam 41 and increases linearly along its length. The bending moment produces strain in the beam and piezoelectric strip. The piezo 43 is manufactured with characteristics such that, when it is subjected to strain of this type, an electrical signal (voltage) is generated across its faces. These two faces have electrodes on them allowing electrical connection, via a coaxial cable, to the control electronics.

The steel beam 41 is an integral part of a larger steel plate 44 in order to facilitate mounting in the pen and making electrical connections. The plate 44 has a rectrangular aperture 45 through which the ink jets pass from the nozzles in use. The details of sensor construction and electrical connection are described further below.

The stylus or tip 42 is the part of the pen which makes contact with the paper writing surface and has to exhibit the following characteristics:

shape and surface texture to provide the best combination of electrical signal (strength and frequency range) and quality of feel to the user. (ie it is detrimental if the sensor is excessively noisy or scratchy).

durability to withstand the very high distance it must travel throughout its life without excessive wear.

The choice of material for the stylus 42 was determined by identifying a material with good wear characteristics without incurring high component cost. Alumina from was chosen to provide a stylus which can be manufactured very cost effectively.

It was determined by testing that the human hand is sensitive to vibrations of less than 1000 Hz and so one objective of the stylus design work was to maximise the energy above 1000 Hz, in order to make the writing action of the pen feel as smooth as possible. A benefit of ceramic tips is that they tend to exhibit more energy above 1000 Hz than say a steel stylus would.

The sensor assembly plate 44, on which the sensor is situated, is a small rectangular plate that is located between the two halves of the casework (see later section on casework). The piezoelectric transducer is of a simple arrangement with electrodes on both faces. One face of the piezoelectric strip is bonded to the beam with a low viscosity epoxy in such a way that there is electrical contact through the adhesive layer via asperities in the surface roughness of the plate and piezoelectric material. With this arrangement the plate forms part of the electrical circuit to the piezoelectric strip.

The stylus or tip 42 consists of an alumina tip 42' bonded into a brass body 42" which is rivetted into the end of the beam (see FIGS. 11A & 11B).

The piezoelectric strip is of dimensions and arrangement shown earlier in FIG. 10 and is manufactured in a lead zirconate titanate grade similar to PZT5A. The sensor beam is manufactured by blanking from sheet metal such as nickel plated spring steel (400–450 VPN). The stylus or sensor tip has a main body which is a small turned component and could be manufactured in a variety of materials. Brass is preferred for its low cost, ease of machining and suitability for rivetting. The stylus or sensor tip has an end formed of alumina in order to provide the necessary wear characteristic as described earlier. It should be possible to manufacture it by pressing and firing in such a way that its shape and surface roughness are as required.

ELECTRONIC SUB SYSTEM (see FIGS. 12A, 12B, 13 & 14)

The electronic sub system 50 provides for control of main power on/off, selection of patterns, pattern modifications and external option features, storage of patterns, processing sensor signals, communicating with external options, power consumption and battery usage, inkjet head fire control. The electronics need to be small in size and low in cost.

A 12 segment display 51 shows pen status: indication of 0 to 9 on single digit plus 1 to 4 on fixed pattern segments and one segment to indicate 'line mode'. Power on/off is provided by a manually operated switch 52 controlling main battery link. All electronics are arranged to be reset to default conditions at power on (except last pattern used and speed setting, stored in non-volatile memory), and a low power consumption mode is triggered by a preselected period of inactivity. An indication (on the LCD) of low power is provided at 3.3 V, to predict end of battery life. Mode selection, using one button 53 to cycle through the options, provides for the instrument to operate in line mode, pattern mode, or density (shading) mode.

Pattern mode enables the one button 53 to select one of four pattern groups; and two further buttons 54,55 to select 1 to 10 pattern number within a group. Line mode allows button 53 to select line style; up/down buttons 54,55 select one of 10 line widths. Density mode is provided by up/down buttons 54,55 selecting 1 of 10 print density settings. Possible line patterns allow for variable line width, broken lines, dot matrix graphics.

The electronics of the example include a Texas Instruments TMS 70C42/82 microprocessor 57 and an application specific integrated circuit (ASIC) 58. Head drivers 59 are provided to drive the inkjet printhead, in the form of 2 discrete high current driver arrays. Non-volatile memory 60 is preferably used to store user defined pattern memory.

Selection switches 53–55 comprise moulded rubber pushbuttons operating directly on printed circuit board electrodes and the power ON/OFF switch 52 is a manually operated single pole switch. A printed circuit board 61 is used to interconnect hardware components. A combination of surface mount and COB or TAB technology are used in assembly of the electronics components.

Power is supplied from NiCad rechargeable batteries 62 to a voltage converter 63 which is ASIC controlled to provide an output voltage of 24 V (±2%) at a maximum output power of 0.6 W.

Operational functions include: multiple line widths, multiple patterns, single shot and "reverse video" (image inversion), and icon printing. Text printing can be accommodated, even though the device is primarily intended as a freehand writing instrument, rather than a printer. For example, simple labels or address information can be printed. Information can be down-loaded by a personal computer or electronic organiser. A message buffer of up to 72 characters is provided at relatively low cost, within the present design, ASCII data transfer being used and the text font fixed.

The microcontroller 57 is the element which controls the device's entire operating process using software which resides within the microcontroller. The user input buttons and the vibration sensor are monitored to detect if a new operating mode is required or if ink is to be ejected. The LCD 51 is set to reflect the current operating conditions. When the user selects a new pattern, data to form the pattern is accessed from either the internal fixed pattern memory, or the external memory in the case of a user defined pattern. If the vibration sensor then becomes active the 12 bits of data (corresponding to the 12 ink jets) are set in the jet firing logic. Custom logic converts the 12 parallel bits to provide the correct sequence of pulses to the substrate. In order to drive the jets at the 24 V specified, drivers are used to withstand the high voltage and currents necessary to eject a dot of ink.

The 24 V supply is produced by the flyback converter 63 which converts the battery voltage (approximately 3.0 V to 4.8 V) to a constant 24 V.

The serial port 64 shown allows the users to down-load their own patterns to the pen which are then stored in the non-volatile memory 60. This ensures pattern data is not lost when power is removed.

ASIC Functions include:

Vibration Sensor Signal Conditioning

FIG. 12B shows that this circuit 70 consists of an input buffer 71, an amplifier 72 with external components 73, a comparator 74 and a monostable block 75.

A high impedance input buffer 71 is necessary as the vibration sensor is itself a high impedance capacitive source of the order of 1 nF. When combined with the input impedance of 480 kΩ the sensor gives a high pass filter with a 3 dB frequency of 330 kHz. The signal of interest produced by the vibration sensor is between 1 kHz and 5 kHz of approximately 1.5 V peak to peak amplitude.

The buffered and referenced signal is then amplified by a factor of approximately 3. The amplifier 72 has some further low pass filtering and a high pass filter to limit the signal bandwidth to the frequency of interest. The low 3 dB frequency is at 1 kHz which suppresses the phenomenon of "bounce" at the start and end of a line or pattern. It is believed that bounce is caused by the very large offset voltage produced when the user first contacts the paper and finally lifts off. This voltage consists of low frequency components and can be attenuated by the high pass filtering mentioned above. The high frequency cut-off frequency of 5 kHz is present to minimise the effects of any spurious signals or interference from electrical noise, which may cause the pen to eject ink inadvertently. The filter characteristics of the amplifier 72 are shown in FIG. 13.

The output of the amplifier 72 is fed to a comparator 74 with hysteresis of 100 mV. This relatively high hysteresis is used to reduce the possibility of false triggering. The signal which is by now digital, is presented to a monostable block 75 which is implemented digitally. The monostable 75 is retriggerable and maintains an active output for 10 ms upon each trigger which prevents the output signal from "dropping out" if the vibration sensor signal is not present for short periods. This usually occurs when the stylus moves slowly across the writing surface. The time must not be too long otherwise the pen will continue to deposit ink after the stylus has stopped moving or is no longer in contact with the surface. Setting the monostable time delay too long is manifested by "tails" appearing at the end of words when writing. The output of the monostable is connected directly to the microcontroller.

Ink Jet Firing Logic

The 12 parallel bits of nozzle data set by the microcontroller 57, must be latched into the ASIC 58 by the address latch 77 and decode logic 78 controlling latches 65,66. The ink jet sequencer logic 79 then fires the appropriate nozzle according to strict timing criteria. The ASIC logic has been designed such that moving jet data to the second latch automatically initiates a firing sequence. It is not possible for all nozzles to fire at once due to hydraulic problems in the ink supply and very high peak currents from the power source. Therefore, at an instant of time only one nozzle is active for the specified 4.5 µs. Each nozzle is fired in turn and separated from the previous pulse by 32 µs. A separation of 32 µs allows the ink hydraulics to function correctly and reduces the peak load on the power source. Under these conditions a sequence of 12 jets requires about 356 µs.

It is important that the jet pulse width of 4.5 µs is maintained accurately to produce good and repeatable printing under all of the specified operating conditions. This is achieved by using the microcontroller 1.0 MHz clock 57' which is in turn supplied from an accurate ceramic resonator 80. The 1.0 MHz signal is divided by 9 to achieve the required pulse width of 4.5 µs. It is important that the 4.5 µs pulse width is not exceeded, otherwise the nozzle thermal resistors will be destroyed. Ensuring the nozzle is not subjected to long pulses is particularly difficult during the time when power is applied. To ensure correct operation, a power on reset (POR) circuit 81 has been designed which instantly resets all outputs to be inactive and does not enable the clock for a period of approximately 5 ms. This should be sufficient time to allow the ASIC to function correctly.

Twelve digital nozzle outputs 82 are provided which interface to the jet drivers 59. The ASIC outputs are capable of sourcing 2.4 mA at 2.4 V, with the minimum supply voltage of 3.0 V. This is necessary to ensure the jet drivers have sufficient signal to correctly drive the nozzles themselves.

LCD Driver

To improve the user interface it was decided to design a small custom LCD 51 to give feedback of the selected operating mode. A 12 bit LCD driver 83 was therefore incorporated into the design of the ASIC.

As with the jet data, the LCD data is latched into two latches 84,85. The LCD driver 83 then converts this data into the signals to drive a 12 segment, duplex LCD. Using two backplanes and driving the LCD 51 in a duplex mode reduces the number of connections from the ASIC to the LCD, which allows a smaller and cheaper ASIC to be designed and improves the manufacturability of the product.

µp Converter Circuit 63

The ink jet head employed is specified to work with 24.3 V voltage pulses. This is not a convenient voltage for a small battery powered product. It is therefore necessary to use a lower voltage battery (ranging from 5 V to an endpoint of 3.0 V) and convert the voltage up to a constant 24.3 V using a flyback technique.

The µp converter circuit requires an absolute voltage reference 86 with which a comparator 87 compares the output voltage 88 (suitably divided by a potentiometer resistor arrangement). If the required output voltage is below a threshold the comparator will allow a frequency source, of approximately 50 kHz, to switch a MOSFET transistor which in turn switches an inductor to provide high positive voltage pulse spikes. The spikes are discharged through a low loss (Schottky) diode into a reservoir capacitor. As the output voltage reaches the required level, the potentiometer feedback stops the frequency source. In this way the output voltage is maintained consistently even as the battery voltage drops from 5.0 V to 3.0 V.

The comparator 87 used in the µp converter circuit 63 uses hysteresis to prevent noise on the power supply continually switching the µp converter on and off. The hysteresis has been selected to be 10 mV. This value is the minimum to ensure accurate maintenance of the jet supply, whilst being generally unsusceptible to power supply noise.

Battery Low Detection Circuitry

The ASIC includes a circuit 81 which monitors the supply voltage from the battery 62. As the battery voltage drops towards the end of its available charge, the voltage drops. When the voltage reaches 3.28 V the ASIC switches an output which is polled by the software in the microcontroller. In this way the user can be warned when the battery is becoming low and he may then take steps to recharge the battery.

Pattern Memory

The example has been designed such that patterns can be created by the user, or fixed at the time of design. The example uses a microcontroller 57 capable of holding up to 28 fixed patterns in its internal memory. For user defined patterns it was decided that it was essential that the patterns remain stored, even when power is removed. Some form of non-volatile memory 60 must therefore be used; either EEPROM or battery-backed RAM. EEPROM was chosen, as the control circuitry for battery backed RAM would be expensive and would require a microcontroller with many more control lines to interface to this type of memory. EEPROM was originally selected because it is truly non-volatile and needs no extra hardware control circuitry. Care must be taken in the software to ensure data is not corrupted, if power is at the instant of being removed. A series of EEPROM integrated circuits which meet our requirements is available with a straightforward two wire serial interface and is ideally suited to our application. These devices are commonly used in products where data is set only occasionally, such as television tuning frequency information. EEPROM is however considerably more expensive than RAM. The EEPROM device chosen was the 24LC04 from Microchip Technology, which could hold up to 7 user-defined patterns.

With non-volatile memory present it is possible to store the operating parameters of the pen, such that the pen returns to its last operating state when switched on. This would be beneficial as the user would not have to change from the default settings to his preferred settings each time the pen is switched on.

If the option to allow the user to create patterns is not present, more fixed patterns should be available. Therefore, if an embodiment does not have any external pattern memory, it will be necessary to use a larger microcontroller with sufficient internal memory for up to 40 fixed patterns. More fixed patterns can be included in such a case because the software to handle the tasks of communicating to the external devices, such as a personal computer or organiser product, and maintaining the user defined pattern memory, is no longer required.

Power Source 62

The pen is of necessity, a battery powered product. However, the power requirements to drive the ink jet head together with the microcontroller and ASIC are very stringent, given that the product must also be made as small as possible. The power source must be capable of supplying 0.9 A pulses in a volume of less than 15 cm$^3$. An end point voltage of 3.0 V is required and no voltage in excess of 7.0 V can be tolerated by the microcontroller or ASIC. Although a number of battery technologies and configurations were considered to meet these strict criteria, alkaline manganese cells, are not able to supply the instantaneous power loads adequately, and require at least 3 cells to form a battery of the right terminal voltage. Lithium cells, such as those used in modern automatic cameras, were also considered as the battery technology has a high energy density. These cells operated well, but to achieve the necessary terminal voltage, two cells were required and the battery was then unacceptably large. Lithium cells were therefore rejected for their size. In addition, it can be seen that lithium cells of this type are very expensive. NiCad batteries are therefore the preferred power source.

Software

The software comprises the following major processing elements:

User interface module

Pattern retrieval module

Print data to ASIC routine.

User Interface Module

In a product of this type, operation must be simple to follow and easily understood. Therefore considerable effort has been spent in designing a user interface which simplifies the complex inner processes of the product. Complicated graphics LCD displays and many selection buttons are also not possible due to cost and product size constraints. The user interface must therefore use the minimum of hardware to provide a simple intuitive user interface. In designing the user interface it may be necessary to sacrifice some of the less useful features, such as the reverse video option, to improve the simplicity of the user interface.

There are many options that a user can select when operating the pen which have been categorised into three main operating modes:

Line Mode—4 line styles can be selected (e.g. continuous, dotted, etc) with each style being available in up to 10 widths.

Pattern Mode—Up to 40 patterns in 4 sets of 10. A pattern is selected by choosing the set of 10 patterns and then the individual pattern number within the set.

Density Mode—To control the density of line or pattern, according to the users preference. A speed index from 1 to 10 can be chosen.

It is important that the use of buttons and resulting display is consistent throughout the operation of the product. To achieve this one button 53 is dedicated to switching the mode cyclically from line mode, to pattern mode to density mode and back to line mode, etc. The display shows icons which inform the user of the current operating mode. Two buttons 54,55 (increase and decrease) are assigned to change the larger (1 to 10) digit and another to change to smaller digit (which is annunciated by the display as either the line style or the pattern group). In this way consistency of use is achieved.

Ease of use, as opposed to ease of learning, has also been considered with respect to the operation of the user interface. It is for this reason that two buttons are used to select the larger digit; one to increment and one to decrement. A "roll-over" 10 or roll-under 1 feature is provided on the increment and decrement buttons respectively. These features allow the user to quickly set the operating conditions when he has become familiar with the user interface controls.

Pattern Retrieval Module

This module is used to set up the pattern or line data from memory, ready for printing. Pattern and line pixel data is printed by the software from an area of RAM storage which is local to the microcontroller. In this local area, the data can be accessed quickly and conveniently. However, it is necessary for the pattern or line information to be copied into this local memory either from internal fixed memory in the case of fixed patterns, or from non-volatile memory for user-defined patterns (if user definable patterns are required). If a pattern is required, a duplicate of the pixel data for the chosen pattern is copied to the local RAM. For line patterns, (continuous or dotted) the pixel pattern is generated algorithmically. The width of the line together with a code for the line style are combined to produce the required pixel pattern. An algorithm is used to create lines of various styles and widths in order to save memory space for further patterns. The pixel pattern is generated when the user selects the appropriate settings in the user interface irrespective of which mode is chosen.

Printing Routine

The method of printing data is governed by the need to accurately deposit ink at a predetermined instant of time. If accurate timing is not maintained the patterns will exhibit striations and inconsistencies in the printed pattern or line. It is acceptable that the user can change the deposition density by moving the pen faster or slower across the writing surface which may indeed produce pleasant effects, but the software must maintain the repetition rate precisely. Therefore, the print control is governed by the hardware timer of the microcontroller 57. With the current design repeatability can be maintained to within 50 μs, which is sufficiently small that it can be neglected for its effect of print quality.

The print routine retrieves the next ink jet pattern to be printed from the local RAM store, selects the required 12 bits of data and then writes this pixel information to the ASIC jet latches 65,66. Writing data to the second ASIC jet latch 66 initiates ink ejection from the nozzles. After extensive proving on a test rig, the software is fixed into the microcontroller 57 by the supplier by a process called "masking". This produces a custom variant of the microcontroller which is fabricated at the silicon processing stage of production.

Electronic Hardware Construction

The requirement for a product which is as small, and pen-like as possible has required continual consideration of the hardware design for the product. In the electronic hardware construction, these constraints mean that the electronic components can not all be commercially packaged parts. It has been necessary to explore the use of chip-on board (COB) assembly techniques. Other more generally available methods of miniaturising the electronics, such as surface mounted assembly technology, have been utilised throughout the design.

In addition to the constraints of a small product, the cost has also been carefully considered. Therefore, readily available components have been used where possible throughout the design. Great efforts have been made to ensure that the PCB 90, to which all the electronic components are connected, is a simple, commonly used type which is consequently low cost. Commercial grade components have been used for the components.

Chip-on-Board has been selected as the most appropriate method of connecting integrated circuits with many connections. The microcontroller and ASIC have 31 and 43 connections respectively, and are therefore suitable for COB assembly. Integrated circuits with fewer than 20 connections do not result in significant savings in board space due to the area overhead associated with the epoxy coating margins. Tape Automated Bonding (TAB) was also considered as an alternative to COB for high density assembly. The primary reason for selecting COB is that the technique is more widely available, although TAB has advantages over COB in the area of individual device testing prior to assembly.

Buttons 53–55

The style of buttons chosen for the pen are of the rubber switch mat type found in many calculators and cameras for the following reasons:
- simple two part switch system
- very low cost
- very simple assembly requirements
- very small occupied volume
- high quality action and appearance The buttons consist of a rubber mat with a conductive rubber 'pill' in each switch position. When the button is depressed the pill creates an electrical path between two interleaving sets of 'fingers' printed on the pcb.

These switches are not suitable for applications where any significant current has to be conducted but only for low current, signal quality applications. They have no ability for toggling and so can only be used as simple push-buttons.

LCD 51

The style of LCD 51 chosen makes contact with the pcb 90 via 'Zebra-strip'. There are various methods of fixing the LCD to the PCB but the lowest volume solution is to use an adhesive such as epoxy. Simple tooling is required at the assembly stage to ensure the correct alignment.

Charge Connector 91

The function of the charge connector 91 does not dictate that it should be positioned at any particular point, but despite this there are very few positions where it would fit as a result of its size and shape. The point chosen immediately behind the cartridge area is a region of appropriate width as it tapers down from the cartridge to the narrow region around the pcb. It is fitted to the bottom end of the pcb 90 and as such forms part of the pcb/battery sub assembly.

On/Off Switch 52

The On/off switch has to close the main power circuit from the battery and as such must have a capacity for peak current around 1 A. It is desirable for it to be pcb mounted to include it in the pcb/battery sub assembly module. FIGS. 5A–5C shows the positioning of the switch 52.

Substrate Flexible Circuit 93 (FIG. 14)

The ink jet substrate 21 has thirteen pads 32 to which power must be provided from contact pads 92 in order to drive it. There are twelve nozzles, each of which has a dedicated contact pad; the thirteenth pad is a 'common'.

The technique used in the ink jet cartridge to make connection consists of a flexible circuit 93 with profiled points corresponding to each pad, and a rubber backing piece 95 to provide contact pressure. The measured contact force at each pad is around 20 g, making the total force around 300 g. The alignment and compression of the pads is obviously crucial to ensure reliable contact.

Alternative contact systems were considered but the approach adopted offers all the qualities required in the pen for example; very compact, few components, simple, very reliable, relatively low cost.

Flexible circuits are available in two basic material formats:
- polyamide which is required if it is necessary to make solder contacts to the circuit since it can withstand sufficiently high temperatures.
- polyester—a much lower cost version, but does not allow soldered connections. About half the price of polyamide.

The contact pads 92 are arranged in two lines corresponding to the substrate 21 and the connections from each line of contacts pass up the two arms 95 of the flexible circuit 93. The connections are formed into 'rosette' arrays 94 at the ends of each arm. These are clamped to the pcb by means of a screw through the central hole. Compliant washers on either side will be made from a hard rubber or similar material and maintain the contact pressure over the life of the pen.

We claim:

1. A hand-held writing device comprising:

an elongate casing having an elongate axis;

an electrically actuated writing head for making marks on a writing surface;

a sensor for detecting movement of the writing head in any direction in a plane parallel to the surface without rotation of the device about its longitudinal axis; and means for causing the writing head to be actuated to cause writing when the sensor detects said movement of the writing head relative to the surface.

2. A device according to claim 1, wherein the writing head is arranged to be able to make a plurality of different types or sizes of marks on a writing surface; and further including means for selecting which of the different mark types or sizes is to be made.

3. A device according to claim 1, wherein the movement sensor is a vibration sensor.

4. A device according to claim 1, wherein the writing head comprises a multi-nozzle ink jet writing head which can be arranged to produce different patterns of marks, density of marks, marks of different width.

5. A device according to claim 1, incorporating a single nozzle, and wherein the size of droplet produced may be adjusted by the selecting means, for example to vary the width of a line being drawn.

6. A device according to claim 1, including a plurality of switches for selecting which of the different mark types or sizes is to be made; an electronic circuit to monitor said switches and said sensor and to generate electrical signals to control the writing head; an electronic power supply circuit to drive said writing head and electronic circuit; and a battery to supply electrical power to said electronic circuit and to said electronic power supply circuit.

7. A device according to claim 1, which includes a supply of marking fluid provided in a replaceable cartridge, the cartridge also mounting the writing head.

8. A device according to claim 7, wherein the cartridge is rotatably mounted in the device and including a spring, said cartridge being held in position against the biasing action of said spring, the writing head having a plurality of contacts and a connector, signals being fed to the head from said connector through said contacts, and said writing head being held against the connector by the spring.

9. A device according to claim 1, including a stylus adapted to engage a writing surface, and wherein the sensor is a piezo-electric vibration sensor, which detects the vibration of said stylus as it travels across the writing surface.

10. A device according to claim 1, including pressure sensing means for determining the pressure being applied to the writing instrument by the user and generating signals in response thereto, said signals from the pressure sensing means being used to select which of a plurality of different line widths the device produces.

11. A device according to claim 10, wherein the pressure sensing means is integral with the movement sensor to reduce the number of parts.

* * * * *